(12) United States Patent
Kellam et al.

(10) Patent No.: US 9,994,459 B2
(45) Date of Patent: Jun. 12, 2018

(54) GRAVITY-FED AND DUAL ION-EXCHANGE WATER FILTRATION BOTTLE

(71) Applicant: ZERO TECHNOLOGIES, LLC, Trevose, PA (US)

(72) Inventors: Doug Kellam, Oak Brook, IL (US); Byron Stanger, Downers Grove, IL (US); Rajan Rajan, Bensalem, PA (US); Ajit Dighe, Northville, MI (US); Charles Lieppe, Delray Beach, FL (US)

(73) Assignee: ZERO TECHNOLIGIES, LLC, Trevose, PA (US)

( * ) Notice: Subject to any disclaimer, the term of this patent is extended or adjusted under 35 U.S.C. 154(b) by 189 days.

(21) Appl. No.: 14/775,177

(22) PCT Filed: Mar. 14, 2014

(86) PCT No.: PCT/US2014/028491
§ 371 (c)(1),
(2) Date: Sep. 11, 2015

(87) PCT Pub. No.: WO2014/144191
PCT Pub. Date: Sep. 18, 2014

(65) Prior Publication Data
US 2016/0031721 A1 Feb. 4, 2016

Related U.S. Application Data

(60) Provisional application No. 61/794,554, filed on Mar. 15, 2013.

(51) Int. Cl.
*C02F 1/00* (2006.01)
*C02F 1/42* (2006.01)
(Continued)

(52) U.S. Cl.
CPC .............. *C02F 1/003* (2013.01); *C02F 1/283* (2013.01); *C02F 1/42* (2013.01); *C02F 1/66* (2013.01);
(Continued)

(58) Field of Classification Search
CPC .......... C02F 1/002; C02F 1/003; C02F 9/005; C02F 2307/02; C02F 2307/04;
(Continued)

(56) References Cited

U.S. PATENT DOCUMENTS 1,834,045 A * 12/1931 Breuil .................... B01J 47/012
210/282
5,486,285 A 1/1996 Feeney
(Continued)

OTHER PUBLICATIONS

International Preliminary Report on Patentability in International Application No. PCT/US2014/028491, dated Sep. 15, 2015.
(Continued)

*Primary Examiner* — Matthew O Savage
(74) *Attorney, Agent, or Firm* — J.A. Lindeman & Co., PLLC

(57) ABSTRACT

Systems, devices, and methods of filtering water utilize an integrated gravity-fed, dual ion-exchange filtration bottle. Flow-through multi-stage filtration technology is applied to a personal water bottle. The system filters water from an upper unfiltered water reservoir through a multi-stage filter to a lower filtered water reservoir. A user then drinks from the lower reservoir. The bottle includes a cap with a filtered water outlet through which filtered water in the lower reservoir is accessed with a straw, spout, or other access device. The cap includes an unfiltered water inlet to allow filling and refilling of the upper reservoir without disassembling the bottle. The bottle includes a filter vent that eliminates air locks and partial vacuum that can develop when unfiltered water drains from the upper reservoir through the (Continued)

filter to the lower reservoir. This gravity-fed dual ion-exchange filtration system allows for more complete removal of dissolved solids.

17 Claims, 16 Drawing Sheets

(51) Int. Cl.
    *C02F 9/00*     (2006.01)
    *C02F 1/28*     (2006.01)
    *C02F 1/66*     (2006.01)
    *C02F 1/50*     (2006.01)
    *C02F 101/00*     (2006.01)
    *C02F 101/12*     (2006.01)

(52) U.S. Cl.
    CPC .............. *C02F 9/005* (2013.01); *C02F 1/505* (2013.01); *C02F 2001/427* (2013.01); *C02F 2101/006* (2013.01); *C02F 2101/12* (2013.01); *C02F 2209/001* (2013.01); *C02F 2209/40* (2013.01); *C02F 2307/02* (2013.01)

(58) Field of Classification Search
    CPC ...... C02F 1/283; C02F 1/42; C02F 2001/427; C02F 2209/001; C02F 2209/40; C02F 2101/006; C02F 1/505
    See application file for complete search history.

(56) References Cited

U.S. PATENT DOCUMENTS

| | | | |
|---|---|---|---|
| 5,560,393 A | 10/1996 | Clack | |
| 6,197,193 B1* | 3/2001 | Archer | C02F 1/003 |
| | | | 210/266 |
| 6,523,711 B1 | 2/2003 | Hughes et al. | |
| 6,962,652 B2* | 11/2005 | Maeno | B01J 39/04 |
| | | | 210/266 |
| 7,381,279 B2 | 6/2008 | Barger et al. | |
| 7,607,592 B1 | 10/2009 | Kim | |
| 7,988,852 B2 | 8/2011 | Duplessis et al. | |
| 8,216,466 B2 | 7/2012 | Bassett et al. | |
| 2002/0117436 A1* | 8/2002 | Rajan | C02F 1/003 |
| | | | 210/266 |
| 2005/0072727 A1 | 4/2005 | Takagi et al. | |
| 2007/0068863 A1* | 3/2007 | Liu | C02F 1/003 |
| | | | 210/282 |
| 2008/0041790 A1 | 2/2008 | Rajan et al. | |
| 2010/0307976 A1 | 12/2010 | King | |
| 2012/0091070 A1 | 4/2012 | Sjauta et al. | |

OTHER PUBLICATIONS

International Search Report and Written Opinion in International Application No. PCT/US2014/028491, dated Jul. 25, 2014.

* cited by examiner

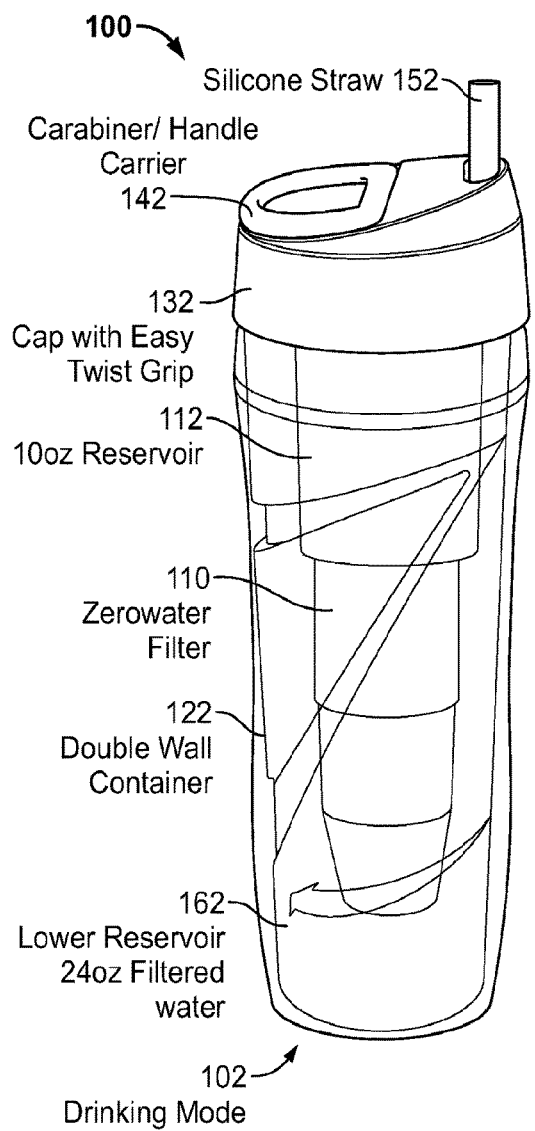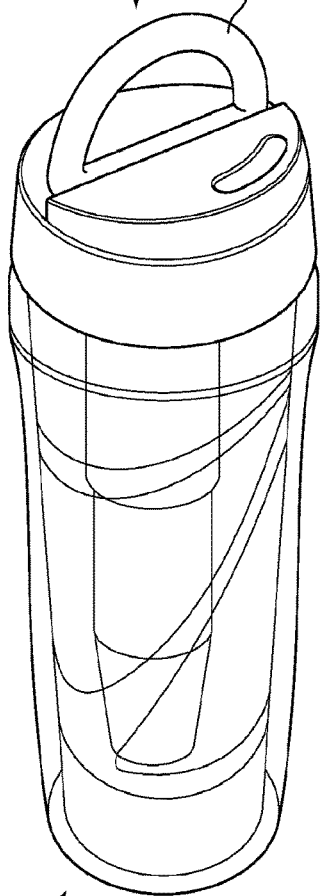
FIG. 1A
FIG. 1B

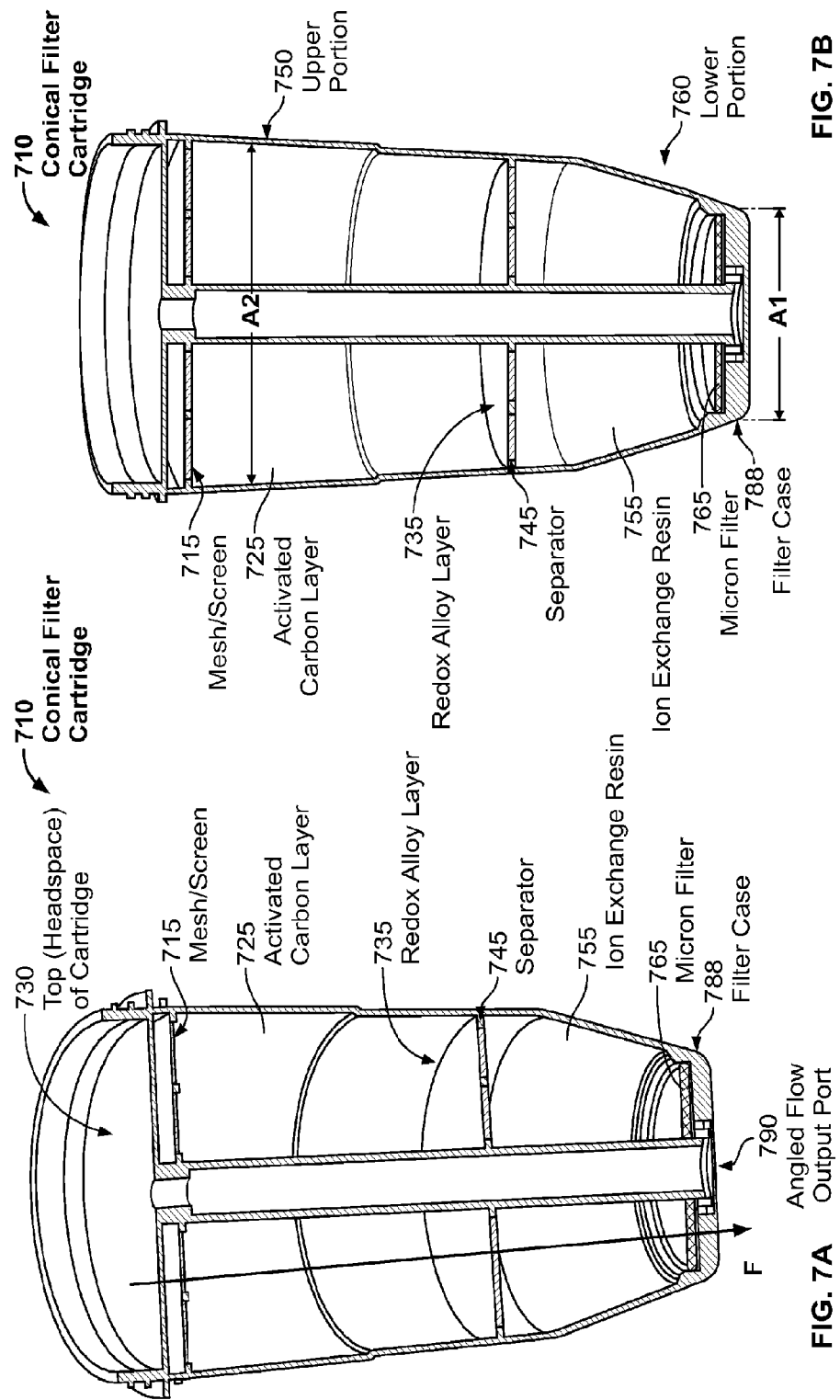

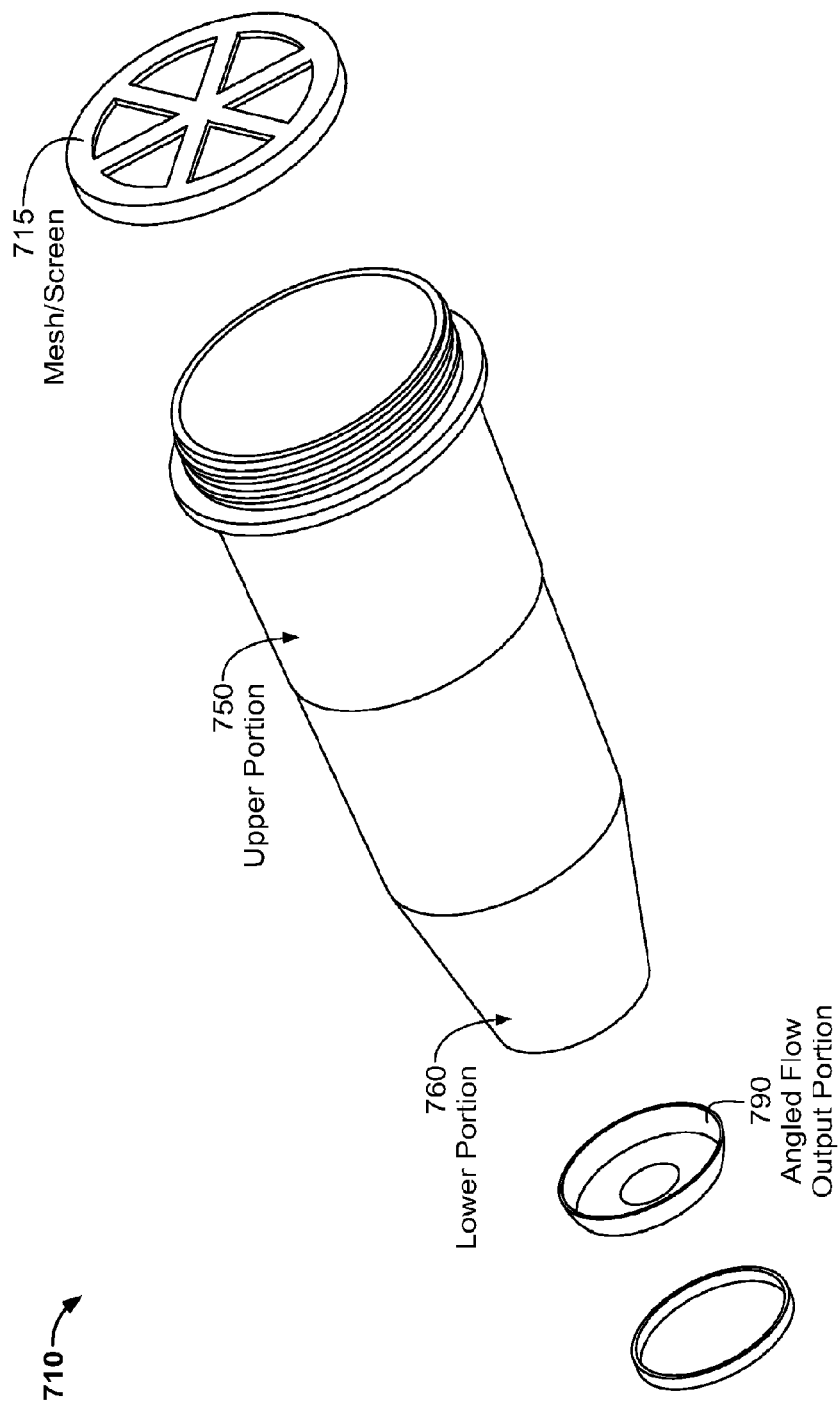

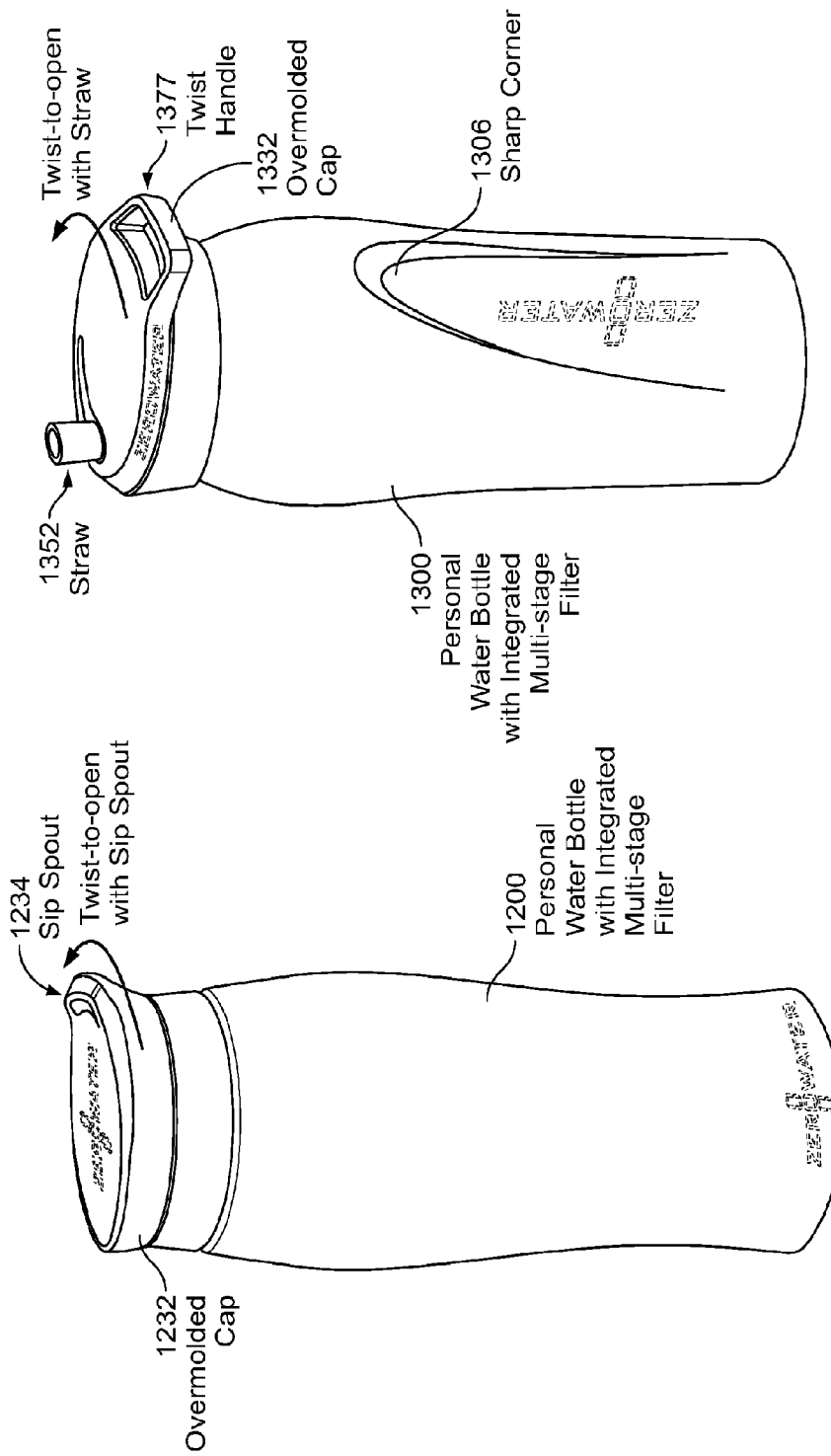

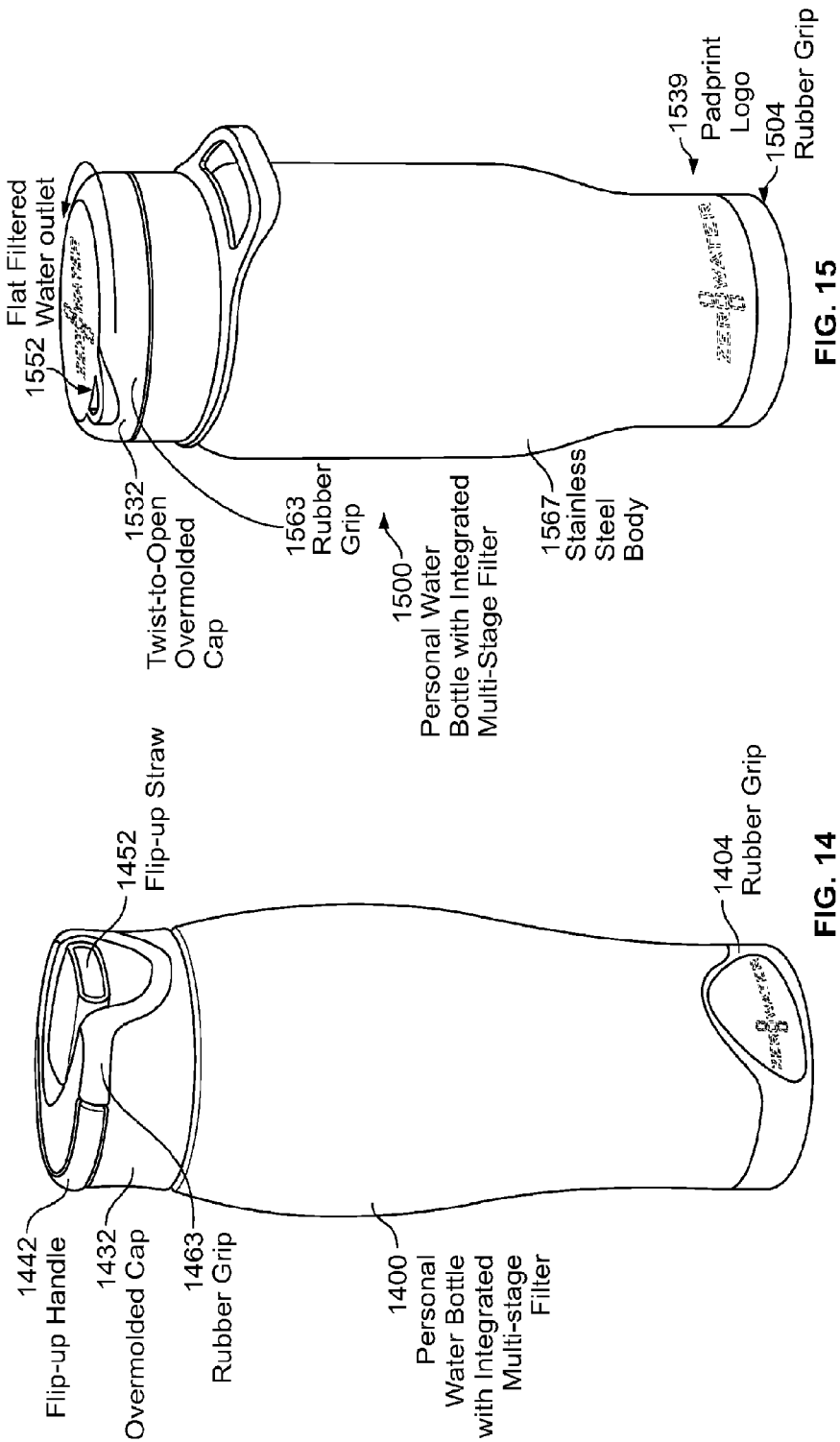

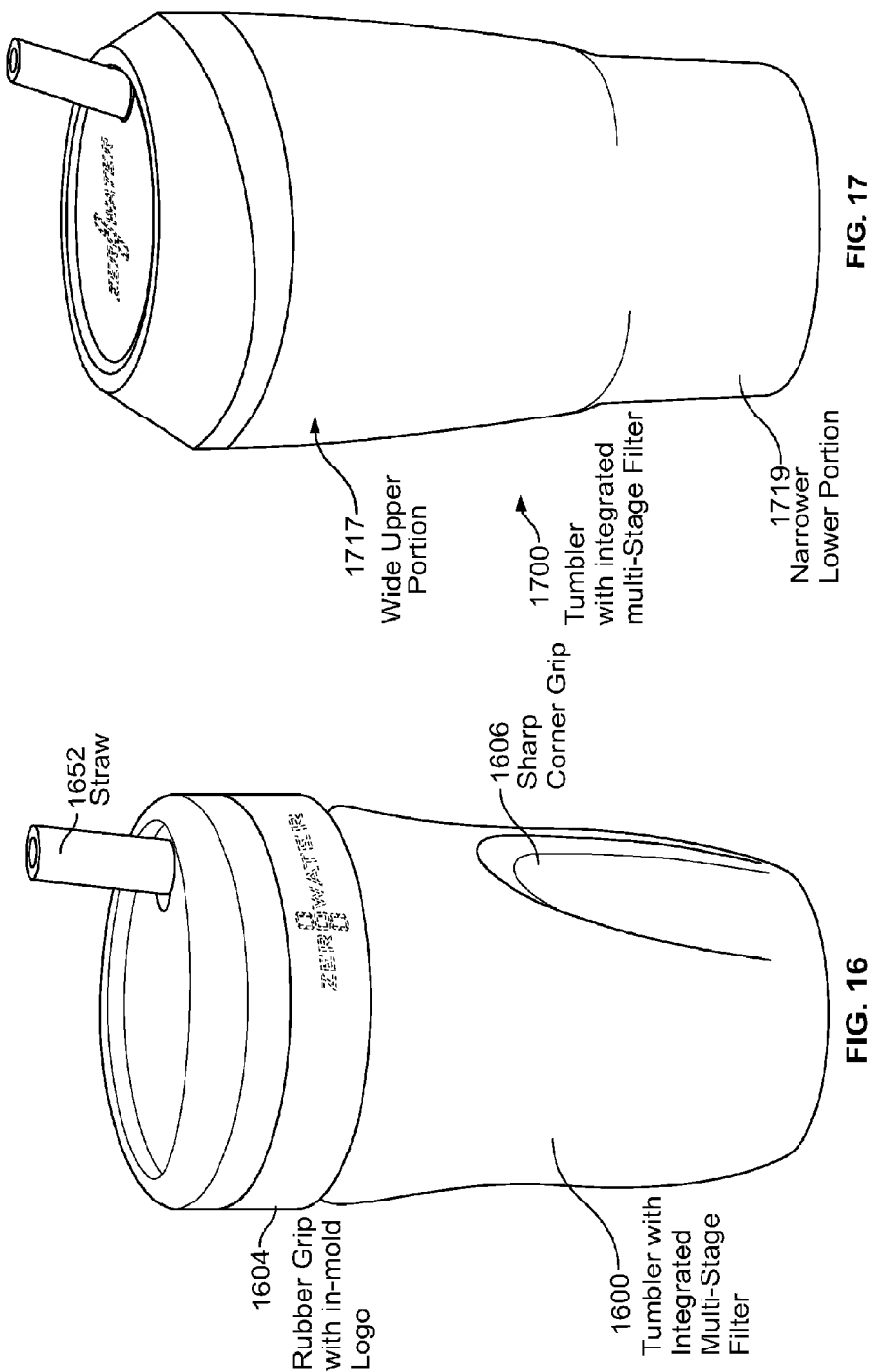

GRAVITY-FED AND DUAL ION-EXCHANGE WATER FILTRATION BOTTLE

CROSS-REFERENCE TO RELATED APPLICATION

This application claims benefit of priority of U.S. Provisional Patent Application Ser. No. 61/794,554 filed on Mar. 15, 2013, the entire disclosure of which is incorporated herein by reference.

TECHNICAL FIELD

This technology relates to systems and methods of water filtration. More particularly, the technology relates to systems, devices, and methods of portable water filtration using a gravity-fed, dual ion-exchange filter.

BACKGROUND

Sources of drinking water can be naturally contaminated with biological impurities and can also be contaminated by chemical and other non-naturally occurring sources.

Some consumers choose bottle drinking water based upon convenience, and the perceived quality of bottled water. In actuality, single-use bottles pose health, sustainability, and environmental issues. The quality of bottled water can be affected by storage conditions. Up to one-third of bottled water can be contaminated by the water sources and the bottling facilities, as well as the use of plastic bottles. Commonly used plastics can leach hydrocarbon-based contaminants into drinking water, particularly when the plastic bottles are stored in direct sunlight or at elevated temperatures. More than three-fourths of plastic water bottles purchased are disposed and sent to land fills instead of being recycled. Bottled water also results in transportation costs and environmental effects because bottled water is often shipped from distant locations, including Poland Spring, Fiji and France. The increased purchase price and environmental costs of single-use plastic bottles raises sustainability issues.

Alternatives to bottled water include reusable bottles, generally designed for sporting and/or camping purposes. Reusable bottles often rely on home or office filtration systems as a refilling source. Other available water supplies vary in quality. Public water supplies can have chlorine and other undesirable tastes, often from metallic conduits. Water supplies can also be affected by the natural source, including hard water obtained from an aquifer or river flowing through limestone. Water sources purified by reverse osmosis systems can be flat and taste badly to consumers. Water derived from wells or poorly maintained storage tanks may also contain contaminants.

Water purification removes undesirable chemicals, biological contaminants, suspended solids, and gases from contaminated water to make the water suitable for drinking. Purification can include physical processes such as filtration, sedimentation, and distillation, biological processes such as slow sand filters or biologically active carbon, chemical processes such as flocculation and chlorination and the use of electromagnetic radiation such as ultraviolet light.

Some portable water filters and purifiers rely on pressure differential, as developed by suction from the mouth piece and/or pressure on the bottle (e.g., squeezing the bottle) for water flow. Other portable systems rely on straws through which the water must be drawn. In these systems, water is purified as it flows from the container bottom to the top. Users must exert a large force (by sucking or squeezing) to draw the water through the purifier. Other portable water purifiers rely on filters and purifiers configured as cartridges that are mounted in the cap of a sports bottle.

Personal sports bottles are used for carrying water and other liquids for quick hydration during sporting activities such as running, cycling, hiking, tennis, golf, hockey, and the like. The cost and inconvenience of accessing filtered water can discourage consumption of sufficient quantities of fluids to adequately hydrate the athlete.

SUMMARY

The claimed invention provides a personal source of great-tasting water on the go, and lets users drink delicious filtered water anywhere, without having to buy bottle after bottle. A user can now simply fill the personal water bottle with tap water and the integrated, gravity-fed, dual ion-exchange filter instantly reduces chlorine, bad tastes, and odors, leaving pure refreshing water.

The devices and methods of the claimed invention provide improvements in filter performance, especially in personal water bottles. The devices and methods of the claimed invention provide improved water filtration, better flow characteristics, improved taste, and simple and effective ways to determine when the filter is no longer effective and needs to be replaced. The personal water bottle of the claimed invention includes a single-walled or double-walled container that includes an integrated gravity-fed, dual ion-exchange filter. An upper unfiltered water reservoir receives unfiltered water, which then flows through a multistage filter to a lower filtered water reservoir. The personal water bottle of the claimed invention also includes a two-part twist-open cap system to provide a positive seal and to provide access to the lower reservoir from which a user can drink. The two-part twist-open cap system allows a user to fill the upper unfiltered water reservoir while a drinking straw remains stationary. A filter vent in the personal water bottle assembly eliminates air locks and the vacuum that can develop when unfiltered water drains from the upper reservoir through the filter to the lower reservoir in an otherwise closed device. The filter vent provides improved water flow from the upper reservoir through the multistage filter to the lower reservoir. The filter vent also provides a venting mechanism to enable water to flow through the filter even when a partial vacuum is created when a user drinks from the bottle. Additionally, the personal water bottle of the claimed invention can be emptied without disassembling the bottle, and the filter can be changed when it reaches the end of its useful life without completely disassembling the bottle.

A personal multi-stage water purification device in accordance with the claimed invention includes an upper unfiltered water reservoir, a water filter, and a lower filtered water reservoir. The upper unfiltered water reservoir includes an unfiltered water inlet and a filtered water through-passage. The water filter is disposed between the upper unfiltered water reservoir and the lower filtered water reservoir, and unfiltered water flows through the water filter to produce filtered water. The personal multi-stage water purification device of the claimed invention also includes a filtered water outlet in flow communication with the filtered water through-passage and the filtered water reservoir. In this fashion, a user can access filtered water from the lower reservoir at the filtered water outlet via the through-passage.

The filter of the personal multi-stage water purification device can be a gravity-fed filter. The filter can include a flow control output port to regulate and control the amount of filtered water output by the filter for a given size water head layer. The flow control output port of the personal multi-stage water purification device can have a smaller cross sectional area than the water head layer of the water filter.

The water filter in accordance with the personal multi-stage water purification device of the claimed invention can include a variety of filter media and filter stages. One example embodiment of the claimed invention includes a water filter with a carbon layer, a redox alloy layer, an ion exchange layer, and a micron filter layer. The carbon layer removes chlorine and/or organic contaminants from the unfiltered water. The redox alloy layer neutralizes pH in the water. The ion exchange layer removes inorganic and/or radiological contaminants in the water. The ion exchange layer can include a mixed bed of cationic and anionic resins. Also, the ion exchange layer can include a water softener. Further, the ion exchange layer can include a color change resin. The micron filter layer eliminates the discharge of carbon dust or other filtration media into the output (filtered) water and further filters out elements larger than one micron, such as cysts, contaminants, and other elements, for example. The micron filter layer also provides an additional level of stability and containment of the filtration media. The water filter can also include a porous separator and/or a screen for removing impurities from water and regulating water flow through the filtration medium.

The personal multi-stage water purification device also includes a cap. The cap can be a rotatable twist-open cap that positively seals the upper unfiltered water reservoir and provides access to the lower filtered water reservoir via the filtered water through-passage. The cap can include an integrated handle carrier. Additionally, the cap can include a rotatable top portion that seals the filtered water through-passage and the lower filtered water reservoir. The rotatable top portion also provides access to an unfiltered water inlet to fill or to refill the upper unfiltered water reservoir. The cap can also include a threaded feature that receives the upper unfiltered water reservoir. The upper unfiltered water reservoir, in turn, receives the water filter using a threaded engagement or other latching mechanism.

The personal multi-stage water purification device of the claimed invention also includes a single or a double-walled container including a latching mechanism that receives the cap. The device also includes a filter vent that eliminates air locks and low pressure in the filter. The filter vent includes a one way valve permitting air flow into the upper reservoir and preventing unfiltered water from flowing out of upper reservoir.

BRIEF DESCRIPTION OF THE DRAWINGS

FIGS. 1A and 1C show a personal water bottle with integrated multi-stage filter in accordance with the claimed invention in a drinking mode.

FIGS. 1B and 1D show a personal water bottle with integrated multi-stage filter in accordance with the claimed invention in a transport mode.

FIGS. 7A and 7B show cross sectional views of an example multi-stage filter used in a personal water bottle in accordance with the claimed invention.

FIG. 7C illustrates an example filter cartridge used in a personal water bottle in accordance with the claimed invention.

FIG. 12 shows a personal water bottle with integrated multi-stage filter that includes another example twist-to-open cap.

FIG. 13 shows another example personal water bottle with integrated multi-stage filter that includes another example cap and straw.

FIG. 14 shows a personal water bottle with integrated multi-stage filter that includes another example cap with a flip up straw and flip up handle.

FIG. 15 shows a personal water bottle with integrated multi-stage filter that includes another example cap with a flat filtered water outlet and a stainless steel body.

FIG. 16 shows a personal water bottle tumbler with integrated multi-stage filter with a rubber grip and sharp corner grip.

FIG. 17 shows a personal water bottle tumbler with integrated multi-stage filter with a wide upper portion and a narrower lower portion.

DETAILED DESCRIPTION

Figure 1C:
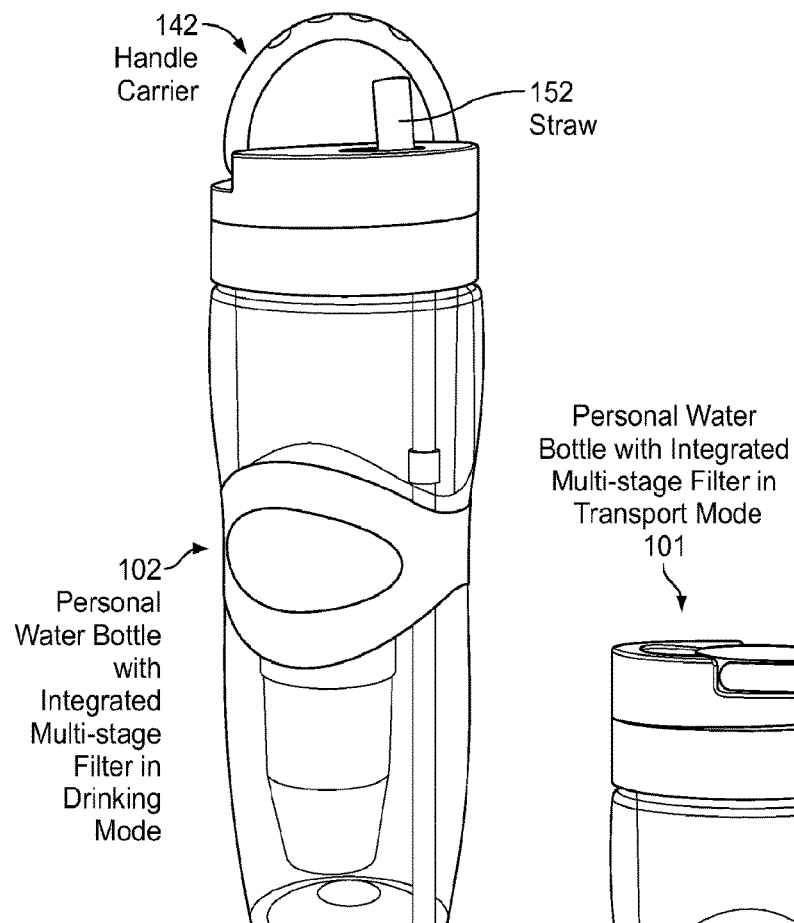

A number of example embodiments of the claimed invention can be used to provide improved filtration, especially in personal water bottles. As shown in FIGS. 1A-1D, the claimed invention includes a personal water bottle with integrated multi-stage filter (bottle) 100. Other example personal water bottles with similar features are shown in FIGS. 2-18. The bottle 100 is shown as reference numeral 101 in a transport mode in FIGS. 1B and 1D and as reference numeral 102 in a drinking mode in FIGS. 1A and 1C.

Figure 3A:
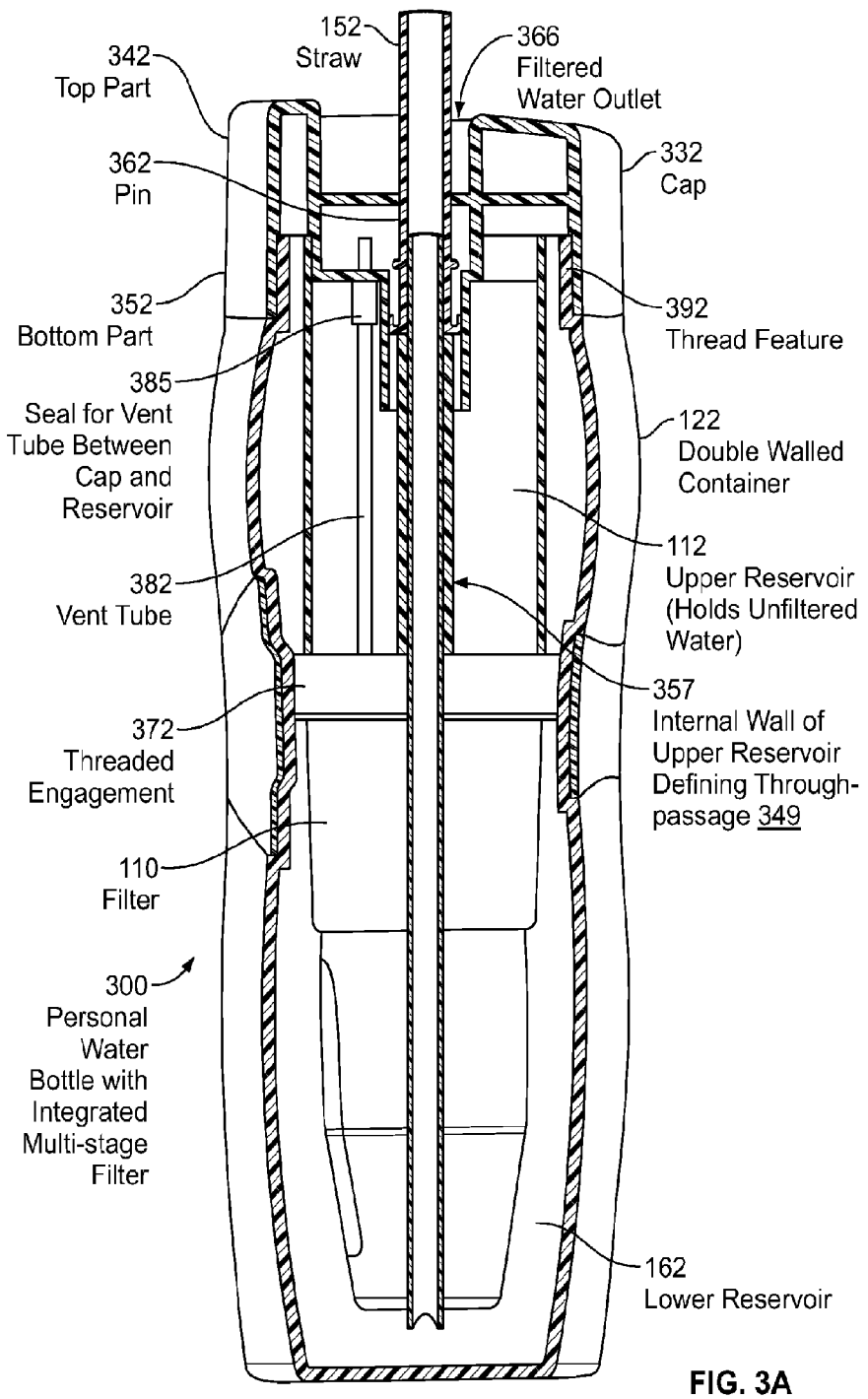
FIG. 3A shows a cross sectional view of an example personal water bottle with integrated multi-stage filter in accordance with the claimed invention.
Figure 3B:
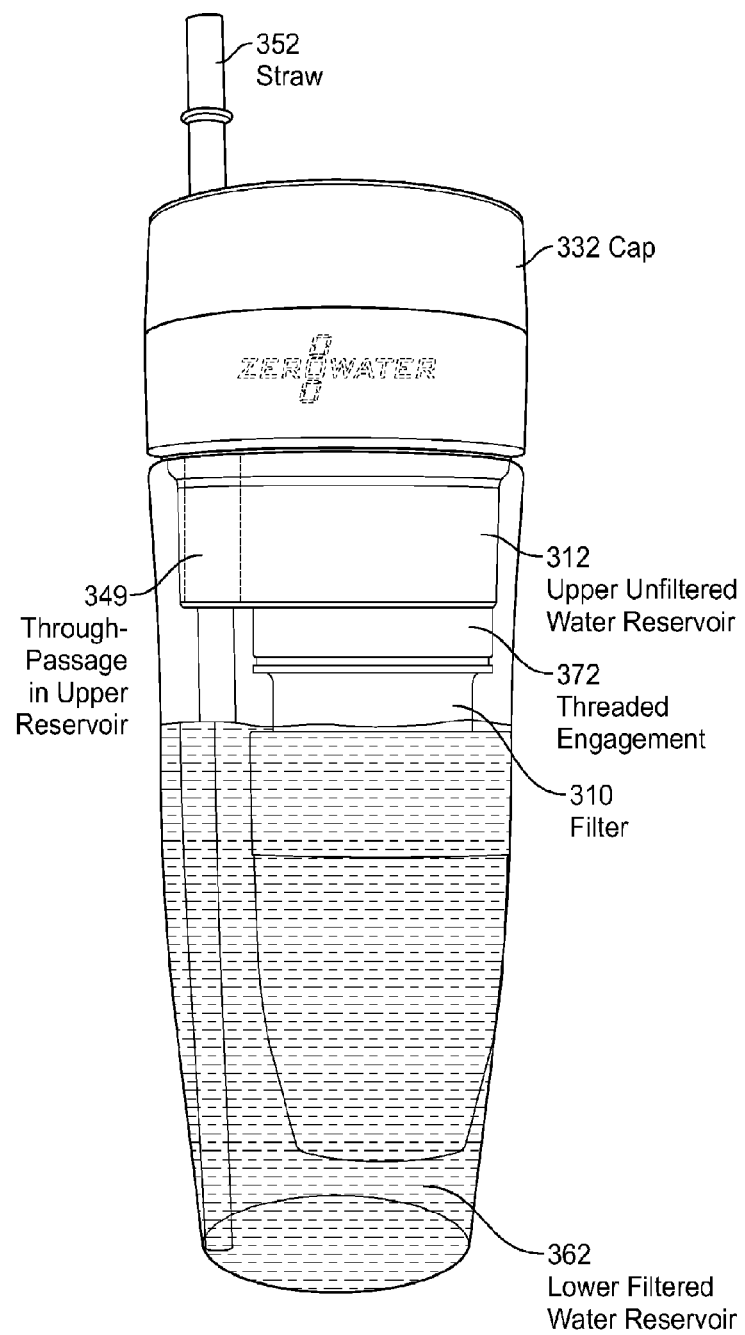
FIG. 3B shows a side view of an example personal water bottle with integrated multi-stage filter in accordance with the claimed invention.
Figure 4:
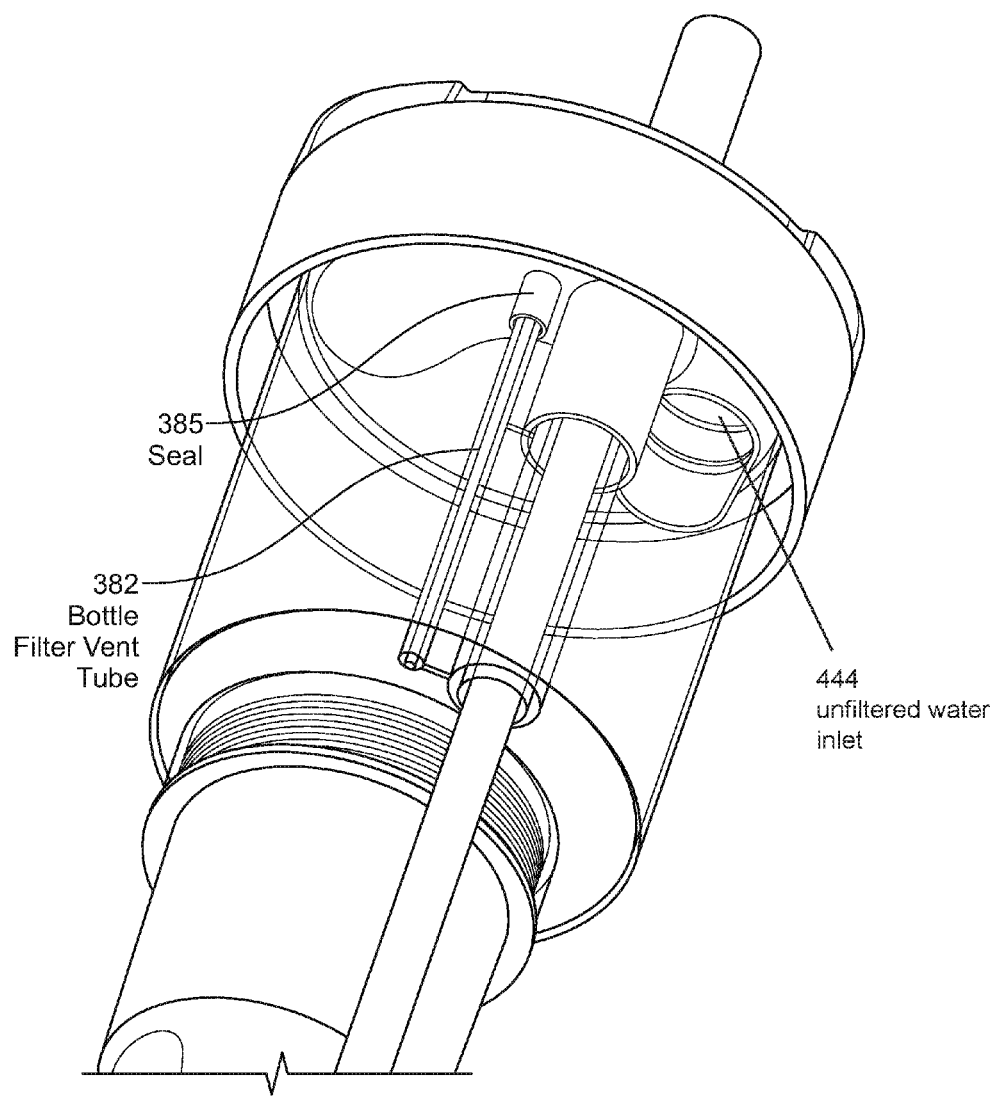
FIG. 4 shows an enlarged view of the underside of a cap and a vent tube used in an example personal water bottle with integrated multi-stage filter in accordance with the claimed invention.
Figure 9:
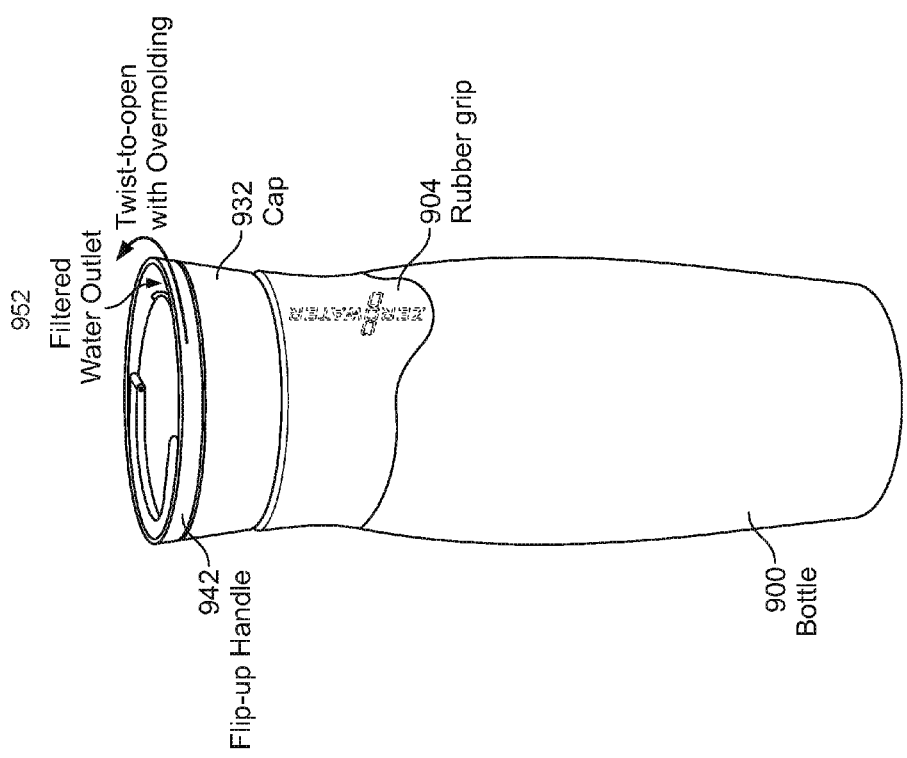
FIG. 9 shows another example personal water bottle with integrated multi-stage filter that includes another example cap.

An example personal water bottle 100 in drinking mode is shown as reference numeral 102 in FIGS. 1A and 1C and includes a main container, such as a single-walled container or a double walled container 122, for example, attached to a cap 132. In the example of FIG. 1A, the cap 132 includes an integrated handle carrier such as carabiner 142, for example. In another example shown in FIGS. 1C and 9, cap 932 includes flip up handle 942 as an integrated handle carrier. As shown in FIGS. 3A, 3B, and 9, the caps 132, 932 include a filtered water outlet 366, 952 through which filtered water can be accessed from a lower filtered water reservoir 162. In the example embodiment shown in FIGS. 1A, 1C, 3A, and 3B, a straw, such as silicone straw 152, extends through the filtered water outlet 366 in the cap 132 through upper unfiltered water reservoir 112 and into the container 122. Inside the bottle, an internal container defining an upper unfiltered water reservoir 112 includes an internal wall defining a through-passage 349 (shown in FIGS. 3A and 3B) that provides a direct fluid path from the lower filtered water reservoir 162 to the filtered water outlet 366 in the cap 132. As shown in FIG. 3A, the internal container is attached to the cap and disposed within and removable from an upper portion of the main container. The internal container defines the upper unfiltered water reservoir. The unfiltered water inlet opens into a top portion of the unfiltered water reservoir, and the internal wall for defines a filtered water through-passage extending through a bottom of the internal container and through the upper unfiltered water reservoir to the filtered water outlet. In the example shown in FIGS. 1 and 3, the through-passage 349 in the upper reservoir 112 surrounds straw 152 (i.e., the straw 152 passes through an inner wall of upper reservoir 112 and does not contact unfiltered liquid in upper unfiltered water reservoir 112). Likewise, when a straw is not used, a user can access filtered water in lower filtered water reservoir 162 using the filtered water outlet 366 and the through-passage 349. A cross section of the through-passage 349 is shown further in FIG. 3A where a cutaway of internal wall 357 is shown. Internal wall 357 forms the through-passage 349 as shown in FIGS. 3A and 3B.

As shown in a number of the Figures, the bottom of the container acts as a lower filtered water reservoir 162 that receives filtered water after the water passes from upper reservoir 112 through a filter 110. The filter 110 can be a multistage filter. Filter 110 is joined to upper unfiltered reservoir 112 in the container 122 as shown in FIGS. 1A-1D. As shown in FIG. 3A, the lower filtered water reservoir is defined within the main container between the bottom of the internal container and the closed bottom end of the main container so that the filtered water through-passage extends to the lower filtered water reservoir. As shown in FIG. 3A, the water filter is disposed within the lower filtered water reservoir and a top end of the water filter is removably attached to the bottom of the internal container. As shown in FIGS. 3A and 7A, the water filter is configured and arranged to receive water from the unfiltered water reservoir, to filter the unfiltered water and to direct filtered water into the lower filtered water reservoir.

Figure 1D:
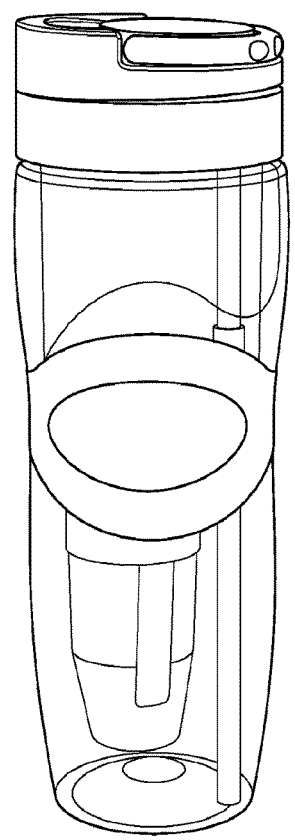

The bottle 100 in transport mode is shown as reference numeral 101 in FIGS. 1B and 1D. In the transport mode, the straw 152 is removed from the bottle 100, and the cap 132 is sealed. The carabiner 142 or handle carrier 942 is rotated to a vertical position to make it easy for a user to grab, hold, and carry the bottle 100. Similarly, in FIG. 9, the flip up handle 942 can be rotated to a vertical position and the cap 932 can be twisted closed to place the bottle 900 in the transport mode.

Figure 11:
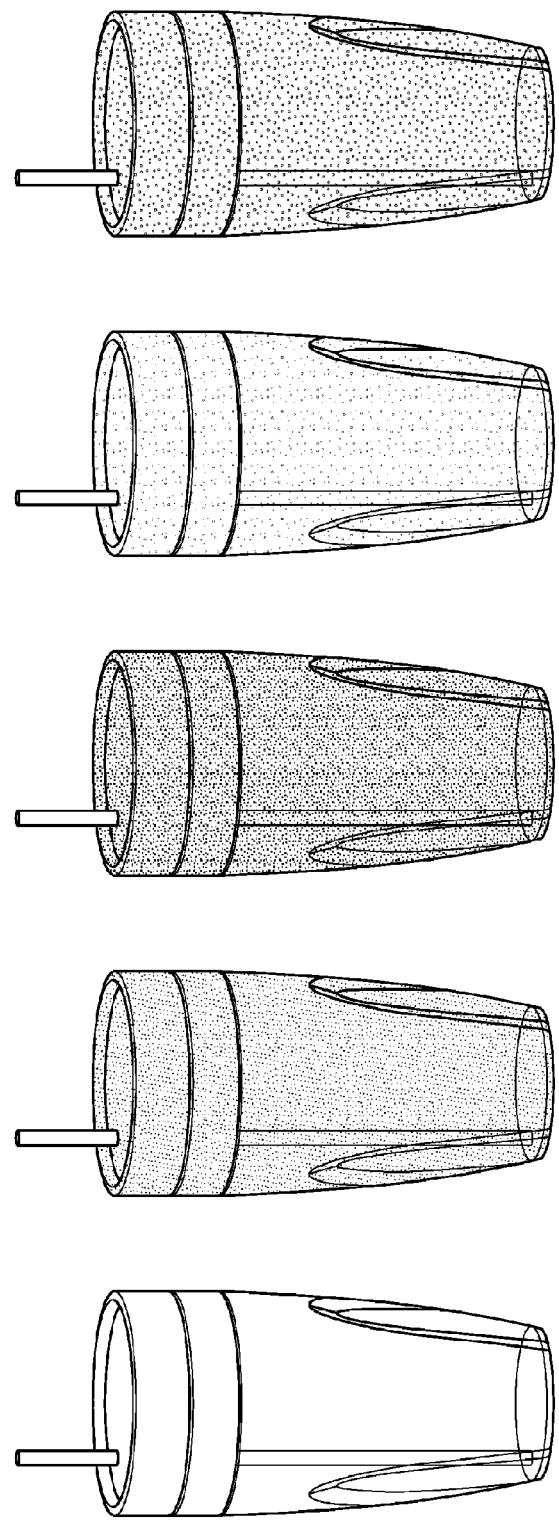
FIG. 11 shows a number of example embodiments of personal water bottles with integrated multi-stage filter that include a sharp corner grip.

The bottles 100, 900 can be made of non-toxic plastics, such as resilient plastics including polyethylene terephthalate (PET), high density polyethylene (HDPE), low density polyethylene (LDPE) and the like. Likewise, the bottle 100 can be made of more rigid plastic materials including acrylonitrile butadiene styrene (ABS), polycarbonate (PC), polypropylene (PP) and the like. Additional materials can also be used in manufacturing the bottle, including aluminum, stainless, steel, and the like. A grip or texture, including the example rubber grip 904 in FIG. 9 can be added to the contour of the bottle 900 to provide a sure grip surface. Similarly, other materials can be added and other recesses can be formed such as sharp corner 1006 in FIG. 10 to provide an improved grip for a user. FIG. 11 shows a number of example embodiments of the bottles that include sharp corner 1006.

Figure 2:
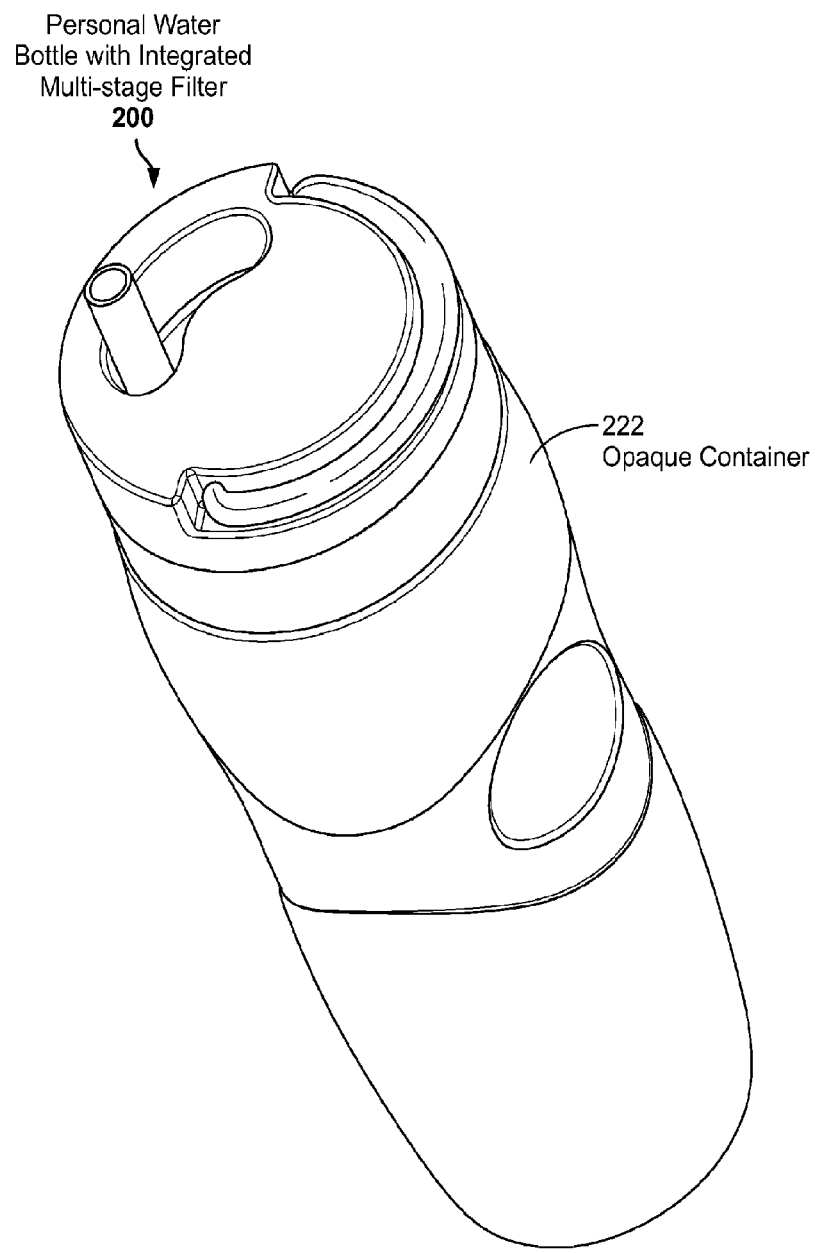
FIG. 2 illustrates another example personal water bottle with integrated multi-stage filter system of the claimed invention with an opaque container.

FIG. 2 shows another example personal water bottle 200 with integrated multi-stage filter system of the claimed invention with an opaque container 222. In the examples of the bottle of the claimed invention shown in FIGS. 1 and 2, the upper reservoir 112 has a capacity of about 10 ounces (about 0.3 liters), and lower reservoir 162 has a capacity of about 24 ounces (about 0.7 liters). Other example embodiments of the claimed invention have upper and lower reservoirs with different volume capacities, such as the tumbler examples shown in the Figures.

FIG. 3A provides a cross sectional view of an example personal water bottle with integrated multi-stage filter (bottle) 300 in accordance with the claimed invention. As shown in FIG. 3A, the bottle 300 includes cap 332 that includes threads or a thread feature 392 to screw the cap 332 to a container, such as double walled container 122. The container 122 includes a reciprocal thread feature (not shown separately) to mate with the cap 332. The cap 332 is designed and manufactured as a two-piece rotatable cap. A top part 342 of the cap 332 rotates about a center locking rotating pin 362 and mates with a bottom part 352 of the cap 332 to seal the bottle 300. Upper reservoir 112 is manufactured and placed into the bottle 100. Upper reservoir 112 can be attached to the bottle 100 in many ways. For example, upper reservoir 112 can be screwed into the top portion of the bottle using a thread feature as shown in FIG. 3A. Additionally, upper reservoir 112 can be attached to the bottle using a latching mechanism and the like. Upper reservoir 112 extends below the cap 332. Upper reservoir 112 receives unfiltered water. Filter 110 is attached to upper reservoir 112 using a threaded engagement 372 and receives the unfiltered water from the upper reservoir 112. The unfiltered water passes through the layers (stages) of the filter 110, and the filtered water collects in lower reservoir 162. The layers (stages) of the filter 110 are described further below. The unfiltered water can pass through the layers of the filter 110 using a gravity-feed process. Straw 152 extends through the cap 332, through the upper reservoir 112 as described above and into the lower reservoir 162. A user can use the straw 152 to access the filtered water from lower reservoir 162.

As shown in FIG. 3 (and in an enlarged view in FIG. 4), a vent tube 382 extends from the cap 332 into the upper reservoir 112. The vent tube 382 includes a seal 385 between the cap 332 and the upper reservoir 112. The seal 385 acts as a one way valve to permit air flow into the upper reservoir 112 and to prevent unfiltered water from flowing out of the upper reservoir 112. By introducing air flow into the upper reservoir 112, the unfiltered water can flow through the filter 110 unfettered. Without introducing air flow in to the upper reservoir 112, a partial vacuum can be created in the upper reservoir 112, and the unfiltered water may be prevented from flowing into the filter 110. The vent allows this flow of air in to the upper reservoir, filter, and/or lower reservoir in order to avoid the creation of a vacuum in the upper reservoir, filter, and/or lower reservoir.

Vent tube 382 can be positioned at the top of the upper reservoir 112 at an opposing side of the filter 110. The vertical central axis of the filter 110 can be offset from the vertical central axis of the personal multi-stage water purification device. Therefore, the vent tube 382 can be offset from the vertical central axis of the personal multi-stage water purification device. When a personal water purification device is tipped over, the weight of the filter 110 will cause the water purification device to roll to the side, such that the (central axis of the) filter 110 is lower than the vent tube 382. The weight of the filter 110 will keep the vent tube 382 above the water level in the purification device, thereby providing a spill resistant device.

Figure 5:
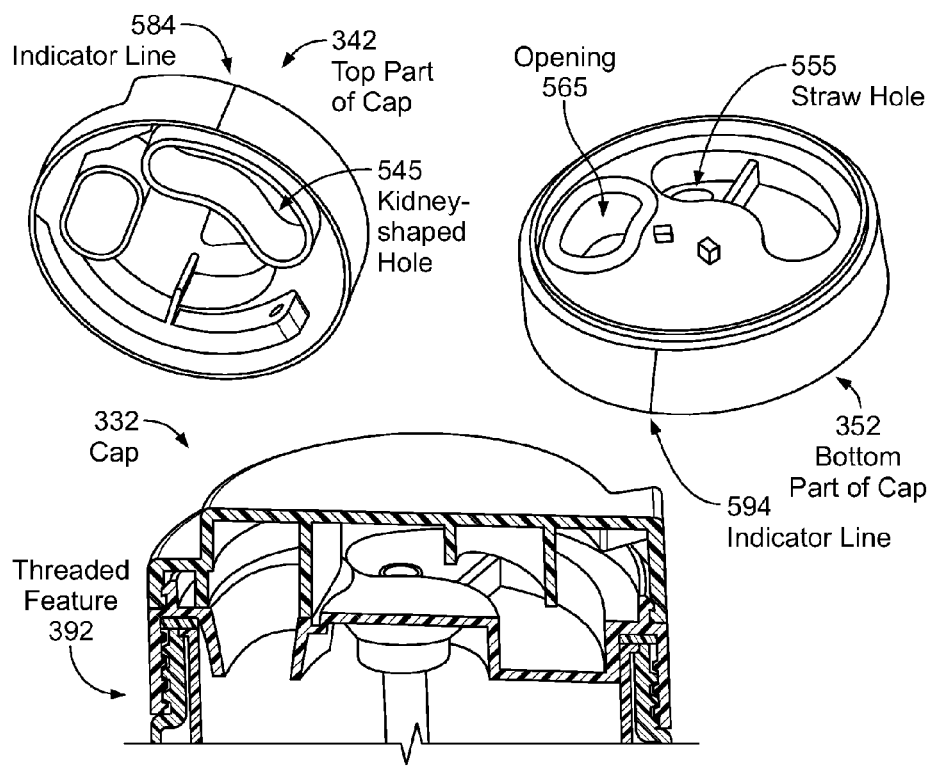
FIG. 5 illustrates as a two-piece rotatable cap used in an example personal water bottle with integrated multi-stage filter in accordance with the claimed invention.

As outlined above and shown further in FIG. 5, the cap 332 is designed and manufactured as a two-piece rotatable cap. Using the rotatable design and manufacture of the cap 332 enables users to refill the upper reservoir 112 with unfiltered water without completely disassembling the bottle 100, To refill the upper reservoir 112, a user rotates the top part 342 of the cap 332 so that an unfiltered water inlet 444 (shown best in FIG. 4) is exposed. In one example embodiment, the unfiltered water inlet 444 is a kidney-shaped hole. As the user rotates the top part 342 of the cap, the kidney-shaped hole 545 is lined up with opening 565 in the bottom part 352 of the cap. Indicator line 584 on the top part 342 of the cap 332 and indicator line 594 on the bottom part 352 of the cap 332 can be aligned to indicate the proper position of the top part 342 and the bottom part 353 of the cap 332. Unfiltered water is added to the upper reservoir 112 through the kidney-shaped hole 545 and the opening 565. When the user is finished adding unfiltered water, the top part 342 of the cap is rotated slightly such that the kidney-shaped hole 545 is no longer aligned with the opening 565. That is, other portions of the top part 342 of the cap 332 cover opening 565. Closed indicator lines (not shown) can provide a visual indication to a user that the kidney-shaped hole 545 is closed off from the opening 565 in the bottom part of the cap. A reminder indicator on the outside of the cap 332 provides a visual cue or reminder to the user to close the lid and properly align the indicator lines after filling the upper reservoir 112 and when changing the filter as described below.

To change the filter 110 in the bottle 100, only a few components of the bottle need to be removed. For example, as shown in FIGS. 3A and 5, the bottom part 352 of the cap 332 can be unscrewed from the threaded feature 392 and the container 122 can be separated from the other components. Once the container 122 is removed, the filter 110 can be unscrewed from the upper reservoir 112 using the threaded engagement feature 372, and the spent filter 110 can be discarded. A new filter can be screwed onto the upper reservoir 112 using threaded feature 372. The container can be reattached to the bottom part 352 of the cap 332, and the bottle 100 can then be used to filter water.

As shown further in FIGS. 3A and 3B, the removable cap 332 covers the straw 152 which protrudes through the top part 342 of the cap 332 and extends downwardly through the bottom part 352 of the cap 332 into the bottle 100. The upwardly extending portion of the straw 152 is the portion with which the user drinks the water from the lower reservoir 162. The top part 342 of the cap 332 is used as a snap-on dome-like cover and has a curved kidney-shaped hole 545 through which the straw 152 can extend. The cap 332 is rotatable through a limited angular extent from a first position allowing the straw 152 to extend vertically upward, to a second position where the top part 342 of the cap contacts the straw 152. In some example embodiments the cap can contact the straw 152 and bend it generally at 90 degrees to the container axis and hold it hidden within the top part 342 of the cap 332. The kidney-shaped hole 545 can be positioned over the upper reservoir 112, and additional (unfiltered) water can be added to the upper reservoir 112 through the hole 545.

Figure 6:
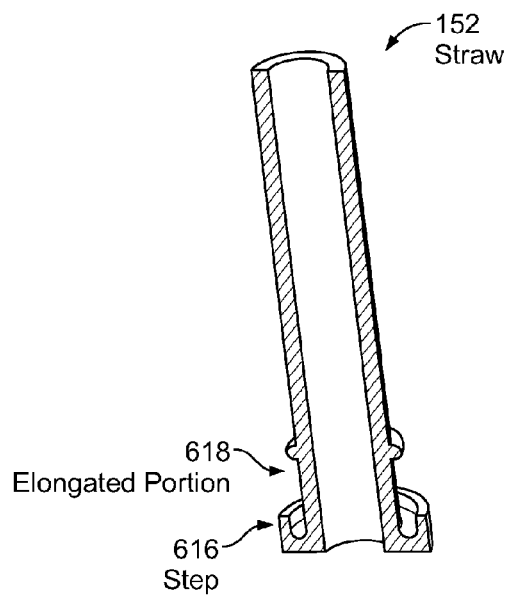
FIG. 6 shows a detailed cross sectional view of a straw used in an example personal water bottle with integrated multi-stage filter in accordance with the claimed invention.
Figure 8:
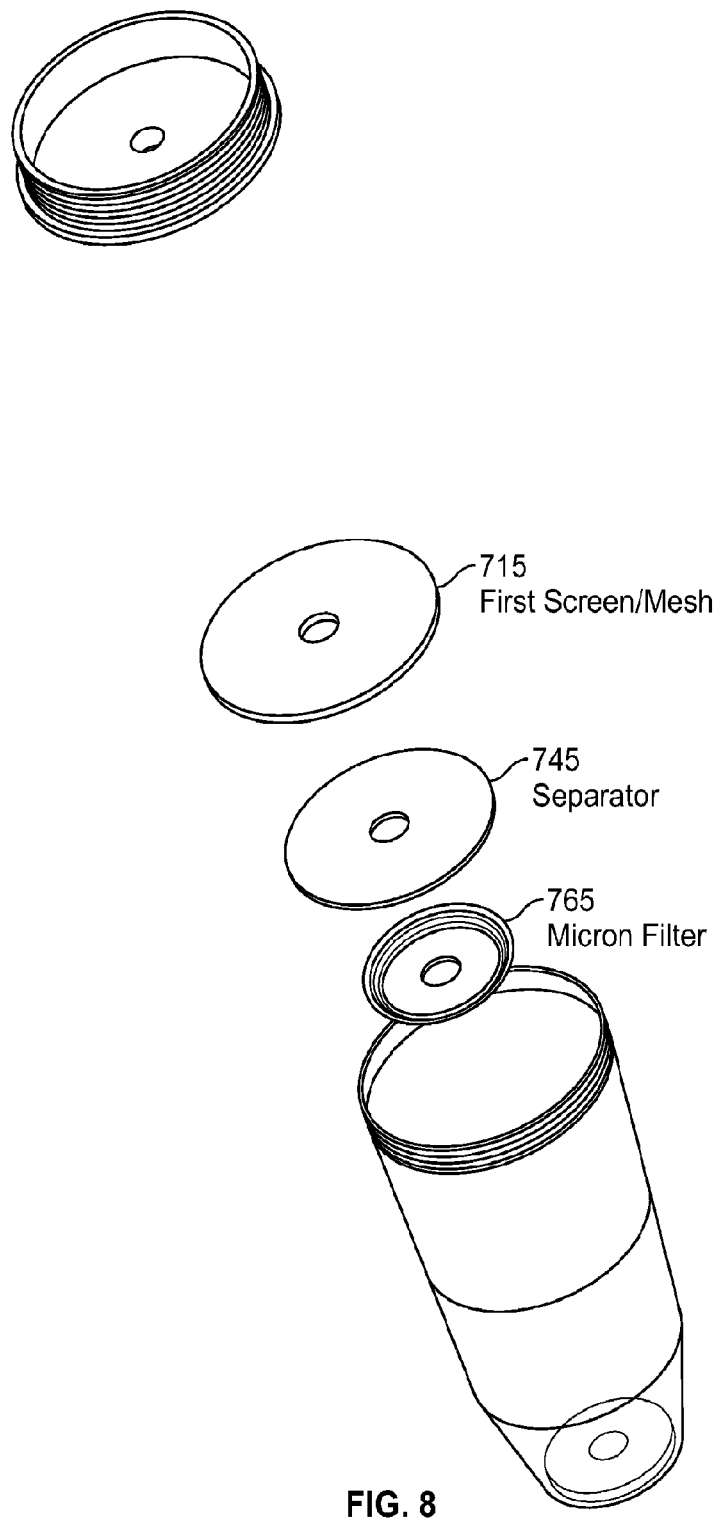
FIG. 8 shows an exploded view of filter components used in a personal water bottle in accordance with the claimed invention.
Figure 10:
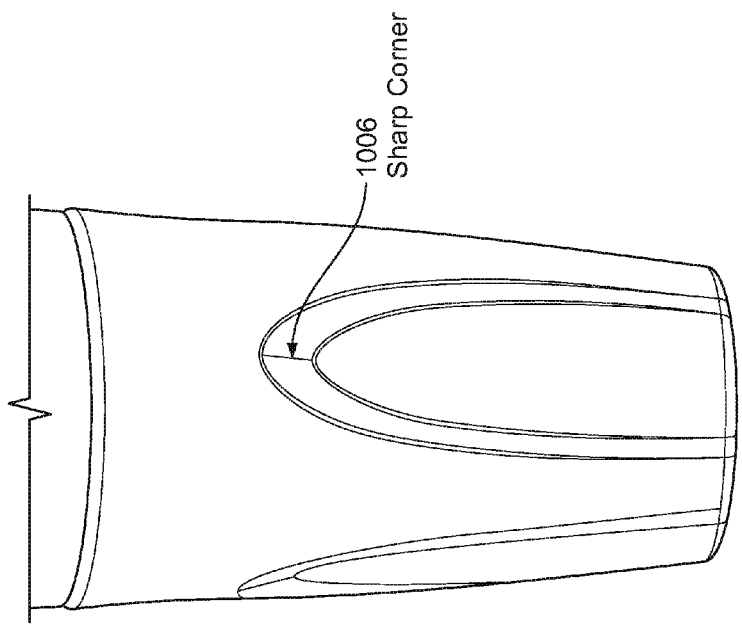
FIG. 10 shows a personal water bottle with integrated multi-stage filter with a sharp corner grip in accordance with the claimed invention.

The straw 152 of the claimed invention is shown in a cross sectional detail in FIG. 6 and includes a step 616. Step 616 forms a U-shaped cross section with the elongated portion 618 of the straw 152. Step 616 provides additional stability when unfiltered water is added to upper reservoir 112 and when the filter 110 is changed.

Component Variations

The example embodiments discussed above and shown in FIGS. 1-6 serve to illustrate the claimed invention. Variations of one or more of the components of the claimed invention can also be incorporated to provide a number of alternative personal water bottles with integrated gravity-fed dual ion-exchange water filtration.

For example, FIG. 12 shows a personal water bottle 1200 with integrated multi-stage filter that includes a variation of the cap described above. Personal water bottle 1200 includes an overmolded cap 1232. Overmolded cap 1232 can incorporate a twist-to-open configuration with a sip spout 1234 as an alternative to a straw (as shown in FIGS. 1-6) and to the flat filtered water outlet 952 shown in FIG. 9.

FIG. 13 shows another example personal water bottle 1300 with integrated multi-stage filter that includes another variation of the cap described above. Personal water bottle 1300 can include a sharp corner 1306 grip and an overmolded cap 1332. Overmolded cap 1332 can incorporate a twist-to-open configuration with a straw 1352 as an alternative to a sip spout 1234 in FIG. 12 and to the flat filtered water outlet 952 shown in FIG. 9. Additionally, overmolded cap 1332 can include a twist handle grip 1377 to make the twist easy to open and close.

FIG. 14 shows another example personal water bottle 1400 with integrated multi-stage filter that includes another variation of the cap described above. Personal water bottle 1400 includes an overmolded cap 1432. Overmolded cap 1432 can incorporate flip up handle 1442 as an integrated handle carrier with a flip-up straw 1452. Personal water bottle 1400 can also include a rubber grip 1404 positioned at the bottom of the bottle 1400 to provide secure positioning when the bottle 1400 rests on a surface, such as a table, cup holder, and the like. Rubber grip 1463 can also be included on the overmolded cap 1432 to provide a sure grip surface to make the cap easy to open and close.

FIG. 15 shows another example personal water bottle 1500 with integrated multi-stage filter that includes another variation of the cap and container described above. Personal water bottle 1500 includes an overmolded cap 1532 with a flat filtered water outlet 1552 (spout). Overmolded cap 1532 does not include a flip up handle but can include a rubber grip 1563 to make the twist cap easy to open and close. Personal water bottle 1500 includes a stainless steel body 1567 and can incorporate a pad print logo 1539. Likewise, personal water bottle 1500 can also include a rubber grip 1504 positioned at the bottom of the bottle 1500 to provide secure positioning when the bottle 1500 rests on a surface, such as a table, cup holder, and the like.

The personal water bottles with integrated multi-stage filter of the claimed invention include tumbler variations as shown in FIGS. 16-19. That is, the personal water bottles can include a flat bottom and no handle or stem. The tumbler variations include a shorter, stouter bottle height. The tumbler variations can include a tumbler with integrated multistage filter 1600 with a rubber grip with in-mold logo 1604 as well as sharp corner grip 1606 as shown in FIG. 16. Additionally, tumbler 1600 can include a straw 1652 at the filtered water outlet.

Similarly, FIG. 17 shows a tumbler with integrated multi-stage filter 1700 with a wider upper portion 1717 (of the tumbler) and a narrower lower portion 1719 of the tumbler. This variation can be used for personal water bottles with integrated multi-stage filters for use in car cup holders, for example.

Figure 18:
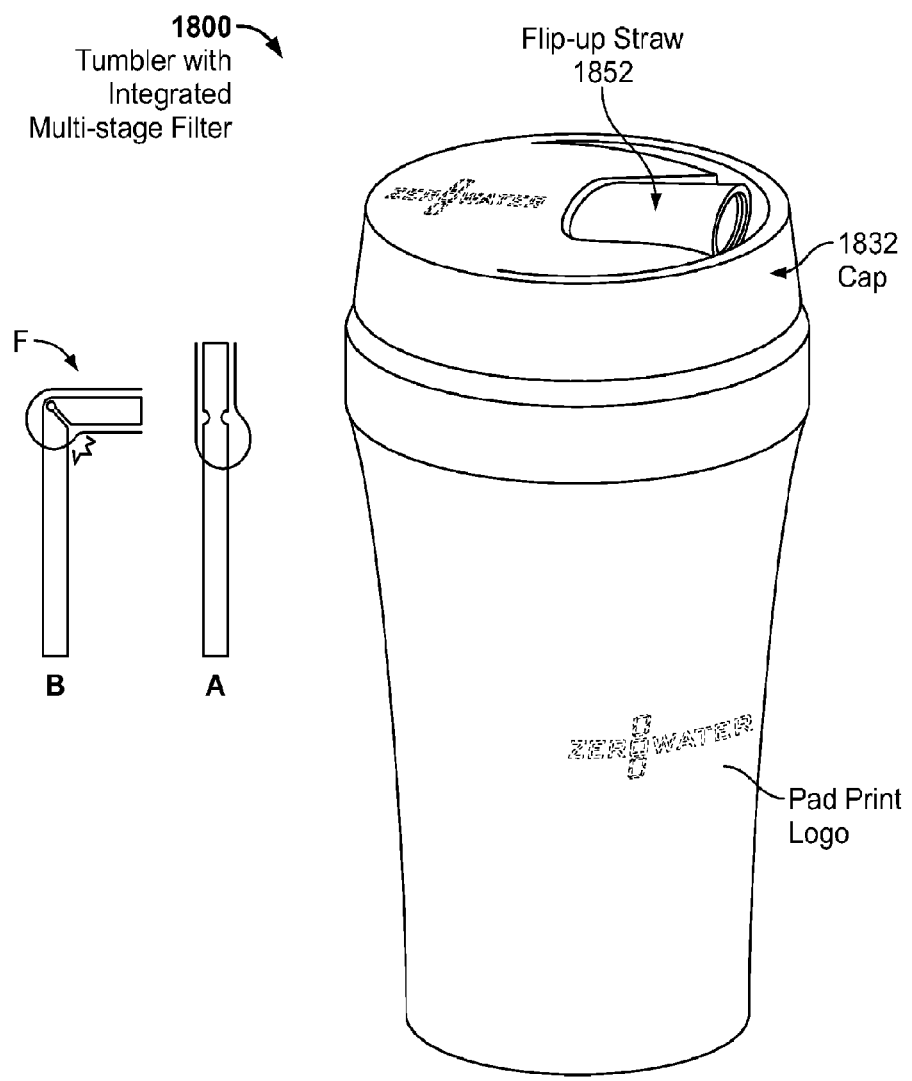
FIG. 18 shows a personal water bottle tumbler with integrated multi-stage filter that includes another example cap with a flip up straw.

Additionally, FIG. 18 shows a tumbler 1800 with a flip-up straw 1852 dispensing feature integrated into cap 1832. Flip-up straw 1852 can be depressed along directional arrow F in FIG. 18 to move the straw from a dispensing position A to a storage position B. Regardless of the overall height and width relationship (e.g., bottle versus tumbler) of the personal water bottles, an integrated multi-stage filter is used to provide clean tasting water to the user.

Filter Layers

As shown in FIGS. 7A-7C, filter cartridge 710 can be manufactured as a polypropylene outer case within which the filter media are housed. Though the discussion below and the exemplary figures refer to certain filter media for the exemplary embodiments, any filter media (media known for purification and treatment of water) or combinations of filter media can be used in this invention. The filter media are chosen, dependent on the requirements of the water purification quality, from sorption means (e.g., activated carbon, synthetic zeolite, schungite, and the like); ion-exchange means (e.g., ion-exchange resins and the like), porous means (e.g., polypropylene, porous glass beads or frits, filter paper, and the like), catalytic means (e.g., KDF and the like), a disinfecting resin (e.g., iodine resin and the like) and mixed media combining properties of means of different compositions. Filter media can be selected and used to remove impurities such as bacteria, heavy metals, chlorine, organic impurities, inorganic impurities, radiological impurities, and the like. The filter media can be in the form of beads, powders, granules, formed between porous membranes or other forms known in the art. Examples of such filter media are described in U.S. Pat. Nos. 8,252,185; 7,413,663; 7,276,161; 7,153,420; 6,752,768; and 5,635,063; all of which are incorporated herein by reference in their entirety. The filter media can be separated into individual layers or mixed together as a whole or with different combinations of filter media being included as different layers. The filters of the invention can contain more than one layer of a particular filter media or filter media mixture.

FIGS. 7A-7B show cross sectional views of the filter cartridge 710 with a number of filtration layers and screens or mesh separators. For example, the first screen or mesh 715 is provided at the top of the filter cartridge 710 and is designed and manufactured to evenly distribute the water across the surface area of the filter layers. One example of the screen/mesh is a polypropylene screen. The even flow of water through the filter prevents channeling within the filter. Channeling occurs when the water or other liquid passes through a less-resistant path of the filter media. That is, a channel is formed within the filter media by repeated flow through a particular area with reduced contact time with the components of the filter media. The first screen/mesh 715 is shown in exploded views in FIG. 7C and 8. The first screen/mesh 715 is also designed and manufactured to contain the underlying layers of filtration media and to prevent the underlying layers of filtration media from shifting.

An activated carbon layer is incorporated in the filter cartridge. As shown in FIGS. 7A-7B, the activated carbon layer 725 can be positioned as a beginning filter stage in the filter cartridge 710. For example, the activated carbon layer 725 can be placed at or near the very beginning of the filtering process. The activated carbon layer 725 is designed and manufactured to remove organic elements from the unfiltered water. The activated carbon layer 725 can be a powdered, granular, or carbon block material.

As shown in FIGS. 7A-7B, a redox alloy layer 735 is also incorporated in the filter cartridge 710. The redox alloy layer 735 can be positioned immediately below the carbon layer 735, or it could be mixed into the carbon layer. The redox alloy layer 735 is designed and manufactured to prevent the growth of mold, mildew, or bacteria in the water, in the filter cartridge, and in the filter materials. One example of the redox alloy layer 735 includes a KDF (Kinetic Degradation Fluxion media) alloy, or other high purity alloys of copper and zinc. One example of the redox alloy layer includes flaked or granulated particulates.

As shown in FIGS. 7A-7B, a separator 745 can be used below the redox alloy layer 735. Separator 745 is designed and manufactured to diffuse the water as it is filtered and to evenly distribute the water across the surface area of the filter layers. The even flow of water through the filter prevents channeling within the filter. The separator 745 is shown in exploded views in FIGS. 7C and 8. One example of the separator is a polypropylene screen. The separator 745 is also designed and manufactured to contain the underlying layers of filtration media and to prevent the overlying and underlying layers of filtration media from co-mingling.

A mixed bed ion-exchange resin 755 is also included in the filter cartridge 710. The mixed bed ion-exchange resin 755 is designed and manufactured to eliminate inorganic elements among other things. One example of the mixed bed ion resin includes approximately one-half anions and one-half cations. The mixed bed ion resin includes a highly developed structure of pores. On the surface of the pores, there are sites with easily trapped and released ions. The trapping of ions takes place with simultaneous releasing of other ions. That is known as the ion-exchange. Cations can be replaced with hydrogen ions, and anions can be replaced with hydroxyls. The hydrogen ions and the hydroxyls can recombine producing water molecules. Additionally, as described below, a color change resin can be included in the mixed bed resin that indicates expiration of the filter. The color change resin can be included in the mixed bed resin and positioned in the filter 710 so that it can be easily be seen without disassembling or otherwise taking apart the personal water bottle. For example, the color change resin can be viewed through one or more transparent "windows" positioned on the filter and on the personal water bottle. In this fashion, an easy indication of the filter's effectiveness can be determined.

A micron filter layer 765 is also included in the filter cartridge 710. In the examples shown in FIGS. 7A, 7b, and 8, the micron filter layer 765 is a one micron filter, such as a non-woven one micron cloth, for example. The micron filter layer 765 is often positioned at the end of the filtration process. However, the micron filter layer 765 can also be placed at other positions (stages) in the filter cartridge 710, such as at the very beginning The micron filter layer 765 is designed and manufactured for a dual purpose. The micron filter layer 765 eliminates the discharge of carbon dust or other filtration media into the output (filtered) water and further filters out elements larger than one micron, such as cysts, contaminants, and other elements, for example. The micron filter layer 765 also provides an additional level of stability and containment of the filtration media.

Additional dividers can also be added between the filter layers to further eliminate inter-mixing of filter media and to further promote the even flow of water through the filter. As outlined above, the even flow of water through the filter prevents channeling within the filter.

Flow Control Output Port

The devices of the claimed invention also include a conical filter output and a flow control output port to regulate the flow level and flow speed of the filtered water. A conical filter cartridge 710 is shown in FIGS. 7A and 7B. An additional exploded view of the filter cartridge is shown in FIG. 7C. The conical filter cartridge 710 is attached to the upper reservoir 112 using the threaded top portion 372 (as previously shown in FIG. 3). Unfiltered water moves from the upper reservoir 112 to the top 730 (water head layer) of the cartridge 710 and flows down and through the cartridge 710 in the direction shown by reference arrow F in FIG. 7A. A lower portion 760, including angled flow output port 790 of the cartridge 710 has a smaller cross sectional area A1 than the cross sectional area A2 of the upper portion 750 of the cartridge 710. As such, the flow rate of the water through area A1 is greater than the flow rate of the water through area A2. That is, the water accelerates through area A1. The size relationship of area A1 to A2 can be varied depending upon the desired output flow rate. The flow rate through the respective portions 760, 750 will be inversely proportional to the cross sectional areas of those sections.

Additionally, the exit opening (flow output port) 790 of the cartridge 710 can also be used to regulate the flow speed of filtered water leaving the cartridge 710 and collecting in the lower reservoir. For example, when unfiltered water moves from the upper reservoir 112 to the top 730 of the cartridge 710 (such as a water head layer of 75 mm) with a gravity flow through the cartridge 710, an exit opening 790 with a hole size of 0.063 inches results in a flow rate of filtered water into the container of approximately 180-200 cc/minute. When combined with the improved flow enhancements, this exit opening 790 in the filter case 788 is a primary determinant of flow rate of the filtered water. The conical geometry of the cartridge 710, and in particular the exaggerated angle of the conical shape in lower portion 760, accelerates the water flow speed, which helps draw water through the wider top of the filter cone (upper section 750) where air bubbles are more likely to slow the flow without this added drawing power. This then leads to a more consistent output of the filter cartridge 710 through exit opening 790, leaving the exit opening 790 as the primary determinant of flow rate through the filter cartridge 710.

By removing other barriers to controlling flow rate and accurately controlling the flow rate through the size and number of exit openings, the "dwell time" of water within the mixed bed of ion-exchange resin in the filter cartridge 710 can be accurately controlled, along with the dwell time within other layers within the filter as a whole. For example, the exit opening 790 of the cartridge 710 can be used to regulate the dwell time of the water with carbon filter layers, ion-exchange resin layers, and other filter layers of the cartridge. Cartridges with water output openings at positions and locations at any part of the cartridge can use the size of the opening to regulate the performance of the filter as well.

This carefully managed flow rate and dwell time is used to maximize the performance and the efficient use of the mixed bed of ion-exchange resin. The systems and methods of the claimed invention maintain a dwell time of a minimum of 3 to 4 minutes in order to remove all dissolved inorganic solids to a level of 0 parts per million when measured by an electronic TDS meter. Even with this dwell time, the systems and methods of the claimed invention can provide an acceptable flow rate (minimum flow of 100 cc per minute). The mixed bed of ion-exchange resin provides improved performance as the elimination of all measurable dissolved solids (with a standard TDS meter) is a feature and benefit of the system. The mixed bed can include an approximate 50/50 mix of anion and cation resins, which will remove all positively and negatively charged ions from the filtered water molecules (measurable to level of 0 parts per million). The range of anion/cation mix is within the 48-52% mix for each for optimum efficiency and maximum amount of water filtered before the resin's potency expires.

This optimum dwell time and flow rate can be managed accurately though the size and number of exit holes, with the exit holes being a primary determinant of flow rate. Other elements of the filter provide optimal filtration performance.

Color Change Resin Filter Expiration Indicator

The inclusion of color change resins in the filter in the personal water bottle provides a simple and effective way for a user to determine if the filter materials have expired and need to be replaced. A color change resin is added to the mixed bed resin to indicate expiration of the filter. As the mixed bed resin expires, the pH of the water becomes more acidic. An acid-base indicator or litmus-type of color change element is added to the resin to indicate when the pH has changed. As the pH of the water becomes more acidic (low pH), the resin with the added acid-base indicator responds to the change in the hydrogen ion concentration and turns color to indicate the change in pH. The color change filter resin provides an immediate visual indication to users of the pH level in the resin and allows users to quickly and simply determine if a filter is expired. No additional tools or meters are needed to make the determination, resulting in a low cost method of evaluating the filter effectiveness. The color change resins are manufactured for use in many cartridge configurations, including top fill, gravity feeding cartridges with output ports of any configuration.

Additional Resin Washing Process

An additional washing process in accordance with the claimed invention is used to provide improved flavor of the filtered water. For example, by further washing the resin prior to assembling the filter, VOC (volatile organic compound) levels can be reduced to below 1 ppb (one part per billion). The resins are then tested repeatedly to ensure that VOC levels are maintained below 1 ppb. By reducing the VOC levels to below 1 ppb, the claimed invention minimizes the potential for amine smell upon expiration or near expiration of the filter. As with all VOCs, amines have a high vapor pressure at room temperature, and large numbers of amine molecules evaporate or sublimate from the compound and enter the surrounding air. Many other combinations of mixed bed resins would typically leave a bad taste initially, and that taste would be even worse upon filter exhaustion or near exhaustion because many mixed bed resins are not designed for filtering drinking water. The combination of extensive washing and testing for max VOC levels ensures the water output of the filters of the claimed invention have a clean taste. The extensive washing and testing of the resins is performed for many cartridge configurations, including top fill, gravity feeding cartridges with output ports of any configuration.

The example embodiments of the claimed systems, devices, and methods of filtering liquids provide personal water bottles with improved performance, improved taste of the filtered water, and a simple and effective way to determine when the filter needs to be replaced.

We claim:

1. A personal multi-stage water purification device comprising:
   a main container having an open end and a closed bottom end;
   a cap for closing the open top end of the main container, said cap defining an unfiltered water inlet and a filtered water outlet;
   an internal container attached to the cap and disposed within and removable from an upper portion of the main container, wherein said internal container defines an upper unfiltered water reservoir, wherein the unfiltered water inlet opens into a top portion of the unfiltered water reservoir, and wherein the internal container includes an internal wall for defining a filtered water through-passage extending through a bottom of the internal container and through the upper unfiltered water reservoir to the filtered water outlet;
   a lower filtered water reservoir defined within the main container between the bottom of the internal container and the closed bottom end of the main container, wherein the filtered water through-passage extends to the lower filtered water reservoir; and
   a water filter disposed within the lower filtered water reservoir, wherein a top end of the water filter is removably attached to the bottom of the internal container, and wherein the water filter is configured and arranged to receive unfiltered water by gravity flow from the upper unfiltered water reservoir, to filter the unfiltered water, and to direct filtered water into the lower filtered water reservoir.

2. The personal multi-stage water purification device of claim 1, wherein a lower end of the water filter has a smaller cross sectional area than an upper end of the water filter.

3. The personal multi-stage water purification device of claim 1, wherein the water filter includes a filtration medium that includes:
   a carbon layer for removing at least one of chlorine or organic contaminants from the unfiltered water;
   a redox alloy layer for neutralizing pH in the water;
   an ion exchange layer for removing at least one of inorganic and radiological contaminants in the water; and
   a micron filter layer.

4. The personal multi-stage water purification device of claim 3, wherein the water filter includes a screen for removing impurities from water and regulating water flow through the filtration medium.

5. The personal multi-stage water purification device of claim 3, wherein a lower end of the water filter has a smaller cross sectional area than an upper end of the water filter to provide a minimum dwell time of three minutes.

6. The personal multi-stage water purification device of claim 3, wherein the ion exchange layer includes a mixed bed of cationic and anionic resins.

7. The personal multi-stage water purification device of claim 3, wherein the ion exchange layer includes a water softener.

8. The personal multi-stage water purification device of claim 3, wherein the ion exchange layer includes a color change resin for indicating when the water filter needs to be replaced.

9. The personal multi-stage water purification device of claim 1, wherein the cap is a rotatable twist-open cap positively sealing the upper unfiltered water reservoir and providing access to the lower filtered water reservoir via the filtered water through-passage.

10. The personal multi-stage water purification device of claim 1, wherein the cap includes a handle for carrying the device.

11. The personal multi-stage water purification device of claim 1, wherein the cap includes a rotatable top portion part that seals the filtered water outlet.

12. The personal multi-stage water purification device of claim 1, wherein the cap includes a rotatable top portion part that accesses the unfiltered water inlet.

13. The personal multi-stage water purification device of claim 1, wherein the cap includes a threaded feature that receives a threaded feature on the main container.

14. The personal multi-stage water purification device of claim 1, wherein the main container is a double-walled container including a thread that mates with a thread on the cap.

15. The personal multi-stage water purification device of claim 1 further comprising: a filter vent tube disposed within the unfiltered water reservoir for defining a vent passage that extends from the unfiltered water reservoir through the top of the main container that eliminates air locks and low pressure in the purification device.

16. The personal multi-stage water purification device of claim 15, wherein the filter vent tube includes a one way valve providing air flow into the upper reservoir and preventing unfiltered wafer from flowing out of upper reservoir.

17. The personal multi-stage water purification device of claim 15, wherein the main container, vent tube, and water filter have respective vertical central axis, and wherein vertical central axes of the vent tube and the water filter are offset from the vertical central axis of the main container to provide a spill-resistant water purification device.

* * * * *